United States Patent
Takaoka et al.

(10) Patent No.: US 10,458,306 B2
(45) Date of Patent: Oct. 29, 2019

(54) ABNORMALITY DIAGNOSIS APPARATUS FOR EXHAUST GAS PURIFICATION SYSTEM

(71) Applicant: TOYOTA JIDOSHA KABUSHIKI KAISHA, Toyota-shi, Aichi-ken (JP)

(72) Inventors: Kazuya Takaoka, Machida (JP); Toru Kidokoro, Hadano (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/809,041

(22) Filed: Nov. 10, 2017

(65) Prior Publication Data

US 2018/0135493 A1    May 17, 2018

(30) Foreign Application Priority Data

Nov. 17, 2016  (JP) ................................ 2016-224069

(51) Int. Cl.
| | |
|---|---|
| *F01N 9/00* | (2006.01) |
| *F01N 13/00* | (2010.01) |
| *F01N 3/027* | (2006.01) |
| *F01N 11/00* | (2006.01) |

(Continued)

(52) U.S. Cl.
CPC ............ *F01N 9/002* (2013.01); *F01N 3/021* (2013.01); *F01N 3/023* (2013.01); *F01N 3/0275* (2013.01); *F01N 11/00* (2013.01); *F01N 13/008* (2013.01); *F01N 2550/04* (2013.01);

(Continued)

(58) Field of Classification Search
CPC .. F01N 11/00; F01N 2550/04; F01N 2560/05; F01N 2560/12; F01N 2560/20; F01N 3/0275

See application file for complete search history.

(56) References Cited

U.S. PATENT DOCUMENTS

| | | |
|---|---|---|
| 2010/0180669 A1 | 7/2010 | Baars et al. |
| 2014/0311129 A1 | 10/2014 | Hashida et al. |
| 2016/0069241 A1 | 3/2016 | Takaoka |

(Continued)

FOREIGN PATENT DOCUMENTS

| | | |
|---|---|---|
| DE | 10 2009 000 286 A1 | 7/2010 |
| JP | 5790777 | 10/2015 |

(Continued)

*Primary Examiner* — Audrey K Bradley
*Assistant Examiner* — Anthony Ayala Delgado
(74) *Attorney, Agent, or Firm* — Finnegan, Henderson, Farabow, Garrett & Dunner, LLP (57) ABSTRACT

An object is to prevent a wrong diagnosis from being made in an abnormality diagnosis apparatus for an exhaust gas purification system including a filter and a PM sensor. After sensor regeneration is performed, the application of voltage to the PM sensor is started, and thereafter abnormality diagnosis of the PM sensor is performed based on whether or not a signal is output from the PM sensor. Abnormality diagnosis of the filter is performed based on whether or not the output value of the PM sensor reaches a predetermined abnormality criterion value. If the output value of the PM sensor reaches the predetermined abnormality criterion value before a predetermined diagnosis completion time after the abnormality diagnosis of the PM sensor, the filter is diagnosed as abnormal, and the application of voltage to the PM sensor is stopped at that time.

2 Claims, 7 Drawing Sheets

(51) Int. Cl.
*F01N 3/021* (2006.01)
*F01N 3/023* (2006.01)

(52) U.S. Cl.
CPC ...... *F01N 2560/05* (2013.01); *F01N 2560/12* (2013.01); *F01N 2560/20* (2013.01); *Y02T 10/47* (2013.01)

(56) References Cited

U.S. PATENT DOCUMENTS

| | | | |
|---|---|---|---|
| 2016/0161458 A1* | 6/2016 | Takaoka | G01N 33/0037 422/98 |
| 2016/0265461 A1* | 9/2016 | Nishijima | F01N 3/0842 |
| 2016/0288037 A1 | 10/2016 | Takaoka et al. | |

FOREIGN PATENT DOCUMENTS

| | | |
|---|---|---|
| JP | 2016-56701 | 4/2016 |
| JP | 2016-99321 | 5/2016 |
| WO | WO 2016/024398 A1 | 2/2016 |

* cited by examiner

ABNORMALITY DIAGNOSIS APPARATUS FOR EXHAUST GAS PURIFICATION SYSTEM

CROSS-REFERENCE TO RELATED APPLICATIONS

This application claims priority to Japanese Patent Application No. 2016-224069 filed on Nov. 17, 2016, the entire contents of which are incorporated by reference.

BACKGROUND

Technical Field

The present disclosure relates to an abnormality diagnosis apparatus for an exhaust gas purification system of an internal combustion engine.

Description of the Related Art

It is known to provide a filter in an exhaust passage of an internal combustion engine to trap particulate matter (which will be also referred to as "PM" hereinafter) in the exhaust gas. Such filters may develop a failure such as melting or breakage. If a filter develops such a failure, the quantity of PM flowing through the filter without being trapped by it increases. In the event of an abnormality with the filter such as a failure of the filter or removal of the filter from the exhaust passage, an increase in the emission of PM to the atmosphere will result. To address this problem, it is known to provide a PM sensor in an exhaust passage downstream of the filter to diagnose abnormality of the filter on the basis of the output value of the PM sensor. A known PM sensor that can be used for abnormality diagnosis of a filter is one including a pair of electrodes as a sensor element and outputting a signal representing the amount of PM trapped and deposited between the electrodes under the application of voltage between them.

Patent Literature 1 discloses abnormality diagnosis of a filter based on the output value of a PM sensor after performing a sensor regeneration process. The sensor regeneration process is the process of removing PM deposited between the electrodes of the PM sensor by oxidation by heating the electrodes of the PM sensor. In the technology disclosed in Patent Literature 1, the application of voltage to the PM sensor is started after performing the sensor regeneration process, and thereafter a determination as to whether or not the filter is abnormal is made based on whether or not the output value of the PM sensor is equal to or larger than an abnormality criterion value at a predetermined determination time. The aforementioned predetermined determination time is set as a time at which the amount of PM deposited between the electrodes of the PM sensor that is estimated on the assumption that the filter is in a predetermined standard failure condition will reach a predetermined criterion PM deposition amount. Patent Literature 2 also discloses a similar technology.

Patent Literature 3 discloses a technology relating to abnormality diagnosis of a PM sensor including a filter component provided between electrodes. In the technology disclosed in Patent Literature 3, abnormality diagnosis of the PM sensor is performed on the basis of the capacitance between the electrodes after the PM deposited in the filter provided between the electrodes has been removed by oxidation by a sensor regeneration process. Patent Literature 4 discloses another technology, in which the timing of measuring the output of a PM sensor for determination as to whether the filter is faulty or not is determined after making a determination as to whether the PM sensor is faulty or not.

Citation List

Patent Literature

Patent Literature 1: Japanese Patent Application Laid-Open No. 2016-056701
Patent Literature 2: DE102009000286A1
Patent Literature 3: Japanese Patent Application Laid-Open No. 2016-99321
Patent Literature 4: Japanese Patent No. 5790777

SUMMARY

When abnormality diagnosis of a filter is performed using a PM sensor provided in the exhaust passage downstream of the filter, abnormality diagnosis of the PM sensor is performed beforehand. The PM sensor is configured to trap PM between its electrodes with application of voltage between the electrodes. When the PM sensor is normal (or sound), even if voltage is applied to the electrodes, it is not until the amount of PM deposited between the electrodes reaches a certain amount to establish electrical continuity between the electrodes by the PM that a signal resulting from electrical continuity between the electrodes is output. On the basis of this fact, in abnormality diagnosis of the PM sensor, application of voltage is started after the completion of the sensor regeneration process. If a signal resulting from electrical continuity between the electrodes is output from the PM sensor immediately after the start of voltage application, it is diagnosed that the PM sensor is abnormal (meaning that the electrodes are short-circuited). If the PM sensor is not diagnosed as abnormal in the abnormality diagnosis of the PM sensor, abnormality diagnosis of the filter using the output value of the PM sensor is performed. In this way, in the abnormality diagnosis apparatus for an exhaust gas purification system including a filter and a PM sensor, a series of processes of abnormality diagnosis including the sensor regeneration process, the sensor diagnosis process for diagnosing abnormality of the PM sensor, and the filter diagnosis process for diagnosing abnormality of the filter is performed.

When the PM sensor is diagnosed as abnormal or the filter is diagnosed as abnormal, it is necessary to informing the user of the result of diagnosis by a notification device such as a warning lamp. If the abnormality diagnosis apparatus is configured to output the diagnosis result that the filter is abnormal to the notification device to cause the notification device to make a notification when the filter is diagnosed as abnormal by the filter diagnosis process in the abnormality diagnosis only once, there is a possibility that a wrong notification about the condition of the filter may be made. In that case, if the filter is mistakenly diagnosed as abnormal in the filter diagnosis process only once accidentally for some reason although the filter is in a normal condition, a wrong notification will be made by the notification device. To avoid this, in some abnormality diagnosis apparatuses for an exhaust gas purification system, a series of processes of abnormality diagnosis including the sensor regeneration process, the sensor diagnosis process, and the filter diagnosis process is performed multiple times, and the diagnosis result that the filter is abnormal is output to the notification device when the filter is diagnosed as abnormal by the filter diagnosis process multiple times successively.

As described above, in some filter diagnosis processes, a determination as to whether or not the filter is abnormal is made based on whether or not the output value of the PM sensor is equal to or larger than a predetermined abnormality criterion value at a predetermined determination time at which the amount of PM deposited between the electrodes of the PM sensor that is estimated on the assumption that the filter is in a predetermined standard failure condition will reach a predetermined criterion PM deposition amount after the start of application of voltage to the electrodes of the PM sensor after the completion of the sensor regeneration process. In such cases, if the actual degree of failure of the filter is much greater than the standard failure condition or if the filter has been removed (or is absent) from the exhaust passage, a very large amount of PM will be deposited between the electrodes during the period from the start of application of voltage to the electrodes of the PM sensor to the aforementioned predetermined determination time. Then, the amount of PM deposited between the electrodes at the time when the sensor regeneration process is started in the next time abnormality diagnosis will be excessively large. Then, even if the sensor regeneration process is carried out in the next time abnormality diagnosis, it may be difficult in some cases to remove the PM from between the electrodes sufficiently to eliminate electrical continuity between the electrodes due to the PM. If this is the case, even when the PM sensor is normal, a signal resulting from electrical continuity between the electrodes will be output from the PM sensor immediately after the start of application of voltage to the electrodes after the completion of the sensor regeneration process. In consequence, even though the PM sensor is sound, the wrong diagnosis that the PM sensor is abnormal will be made in the sensor diagnosis process performed after the sensor: regeneration process. Then, even though the filter is diagnosed as abnormal by the filter diagnosis process in the first abnormality diagnosis, the PM sensor is diagnosed as abnormal by the sensor diagnosis process in the next time abnormality diagnosis. In that case, the filter diagnosis process is not performed in the next time abnormality diagnosis. Then, the diagnosis result that the filter is abnormal is not output in the case where the abnormality diagnosis apparatus is configured to output the diagnosis result that the filter is abnormal when the filter is diagnosed as abnormal multiple times in successive filter diagnosis processes when the abnormality diagnosis is performed multiple times. Moreover, although the PM sensor is actually normal, the abnormality diagnosis apparatus outputs the diagnosis result that the PM sensor is abnormal. When this diagnosis result is output to the notification device, the wrong notification that the PM sensor is abnormal is made by the notification device.

The present disclosure has been made in view of the above-described problem, and an object of the present disclosure is to prevent an abnormality diagnosis apparatus that diagnoses abnormality of an exhaust gas purification system including a filter and a PM sensor from outputting the wrong diagnosis result that the PM sensor is abnormal although the PM sensor is actually normal but the filter is abnormal.

Solution to Problem

According to the present: disclosure, there is provided an abnormality diagnosis apparatus for an exhaust gas purification system including a filter provided in an exhaust passage of an internal combustion engine to trap particulate matter in exhaust gas and a PM sensor that is provided in the exhaust passage downstream of said filter, has a pair of electrodes as a sensor element, and outputs a signal representing the amount of PM deposited between said electrodes when electrical continuity between said electrodes is established due to deposition of PM between the electrodes. The abnormality diagnosis apparatus for an exhaust gas purification system comprises a controller comprising at least one processor configured to: control application of voltage to said electrodes of said PM sensor; perform an abnormality diagnosis process which is a series of processes of abnormality diagnosis including a sensor regeneration process of removing PM deposited between said electrodes of said PM sensor, a sensor diagnosis process of diagnosing abnormality of said PM sensor, and a filter diagnosis process of diagnosing abnormality of said filter, said sensor regeneration process being the process of removing PM deposited between said electrodes by oxidizing it by heating said electrodes of said PM sensor for a predetermined regeneration period, said sensor diagnosis process being the process of determining whether or not said PM sensor is abnormal based on whether or not a signal resulting from electrical continuity between said electrodes is output from said PM sensor after the application of voltage to said electrodes of said PM sensor is started by the controller at a predetermined voltage application start time after the completion of said sensor regeneration process, said filter diagnosis process being the process of determining whether or not said filter is abnormal based on whether or not the output value of said PM sensor reaches a predetermined abnormality criterion value by a predetermined diagnosis completion time at which the amount of PM deposited between said electrodes of said PM sensor that is estimated on the assumption that said filter is in a predetermined standard failure condition will reach a predetermined criterion PM deposition amount after the completion of said sensor diagnosis process, said filter diagnosis process being performed when said PM sensor is not diagnosed as abnormal by said sensor diagnosis process; and output a diagnosis result of said sensor diagnosis process or a diagnosis result of said filter diagnosis process when said abnormality diagnosis process is performed by the controller, wherein if said PM sensor is diagnosed as abnormal by said sensor diagnosis process when said abnormality diagnosis process is performed, the controller outputs the diagnosis result that said PM sensor is abnormal, and if said filter is diagnosed as abnormal in said filter diagnosis process multiple times consecutively when said abnormality diagnosis process is performed multiple times, the controller outputs the diagnosis result that said filter abnormal. While said abnormality diagnosis process is performed by said controller, if the output value of said PM sensor reaches said predetermined abnormality criterion value before said predetermined diagnosis completion time after the completion of said sensor diagnosis process, said controller diagnoses said filter as abnormal in said filter diagnosis process and stops the application of voltage to said electrodes of said PM sensor at the time when the output value of said PM sensor reaches said predetermined abnormality criterion value.

In the abnormality diagnosis apparatus according to the present disclosure, the abnormality diagnosis process which is a series of processes of abnormality diagnosis including the sensor regeneration process, the sensor diagnosis process, and the filter diagnosis process is performed by the controller. The sensor regeneration process is the process of removing PM deposited between the electrodes of the PM sensor by oxidizing it by heating the electrodes of the PM sensor for the predetermined regeneration period. After the completion of the sensor regeneration process, the application of voltage to the electrodes of the PM sensor is started by the controller at the predetermined voltage application start time, whereby PM starts to be trapped between the electrodes of the PM sensor.

After the application of voltage to the electrodes of the PM sensor is started, the sensor diagnosis process is performed firstly. In the sensor diagnosis process, it is determined whether or not the PM sensor is abnormal based on whether or not a signal resulting from electrical continuity between the electrodes is output from the PM sensor. If the PM sensor is not diagnosed as abnormal by the sensor diagnosis process, the filter diagnosis process is performed next. In the filter diagnosis process, it is determined whether or not the filter is abnormal based or whether the output value of the PM sensor reaches the predetermined abnormality criterion value by the predetermined diagnosis completion time after the completion of the sensor diagnosis process. The predetermined diagnosis completion time is set as a time at which the amount of PM deposited between the electrodes of the PM sensor that is estimated on the assumption that the filter is in the predetermined standard failure condition will reach the predetermined criterion PM deposition amount.

The controller provided in the diagnosis apparatus according to the present disclosure further outputs the diagnosis result of the sensor diagnosis process or the diagnosis result of the filter diagnosis process to a notification device or the like. If the PM sensor is diagnosed as abnormal by the sensor diagnosis process when the abnormality diagnosis process is performed, the controller outputs the diagnosis result that the PM sensor is abnormal. If the filter us diagnosed as abnormal by the filter diagnosis process multiple times consecutively when the abnormality diagnosis process is performed multiple times, the controller outputs the diagnosis result that the filter is abnormal. Thus, the possibility of outputting a wrong diagnosis result about the condition of the filter is made lower than in the case where the diagnosis result that the filter is abnormal is output when the filter diagnosed as abnormal in the filter diagnosis process only once.

In the abnormality diagnosis apparatus according to present disclosure, while the abnormality diagnosis process is performed by the controller, if the output value of the PM sensor reaches the predetermined abnormality criterion value before the predetermined diagnosis completion time after the completion of the sensor diagnosis process, the controller diagnoses the filter as abnormal and stops the application of voltage to the electrodes of the PM sensor at the time when the output value of the PM sensor reaches the predetermined abnormality criterion value.

When the degree of actual failure of the filter is much greater than the predetermined standard failure condition or when the filter has been removed (or is absent) from the exhaust passage, the output value of the PM sensor will reach the predetermined abnormality criterion value earlier than the predetermined diagnosis completion time because the rate of increase of the amount of PM deposited between the electrodes of the PM sensor is high in such cases. In such cases, the application of voltage to the electrodes of the PM sensor is stopped at the time when the output value of the PM sensor reaches the predetermined abnormality criterion value before the predetermined diagnosis completion time. In consequence, PM is not trapped between the electrodes any longer after the time when the output value of the PM sensor reaches the predetermined abnormality criterion value. Therefore, even if the degree of actual failure of the filter is much greater than the predetermined standard failure condition or the filter has been removed from the exhaust passage, the amount of PM deposited between the electrodes of the PM sensor is prevented from exceeding the amount corresponding to the predetermined abnormality criterion value.

Thus, even if the degree of actual failure of the filter is much greater than the predetermined standard failure condition or the filter has been removed from the exhaust passage, an excessively large amount of PM is prevented from being deposited between the electrodes with the application of voltage to the electrodes of the PM sensor in the abnormality diagnosis process. Then, in the next time abnormality diagnosis process, the PM deposited between the electrodes can be removed satisfactorily by performing the sensor regeneration process. In other words, circumstances in which PM cannot be removed from between the electrodes by performing the sensor regeneration process sufficiently to eliminate electrical continuity between the electrodes due to the PM are prevented from occurring. Consequently, in the sensor diagnosis process performed in the next time abnormality diagnosis process, the wrong diagnosis chat the PM sensor is abnormal is prevented from being made despite the fact that the PM sensor is actually normal. If the filter is actually abnormal, the filter will be diagnosed as abnormal in the filter diagnosis process performed after the sensor diagnosis process in the next time abnormality diagnosis process. Thus, when the abnormality diagnosis process is performed by the controller multiple times, the PM sensor will not be diagnosed as abnormal in any sensor diagnosis process, and the filter will be diagnosed as abnormal in the filter diagnosis process multiple times consecutively.

As above, according to the present disclosure, even if the degree of actual failure of the filter is much greater than the predetermined standard failure condition or the filter has been removed from the exhaust passage, the PM sensor will not be diagnosed as abnormal so long as the PM sensor is actually normal, and the diagnosis result that the filter is abnormal will be output by the controller. Thus, the wrong diagnosis result that the PM sensor is abnormal is prevented from being output despite the fact that the PM sensor is actually normal but the filter is abnormal.

The predetermined regeneration time in the sensor regeneration process may be made long so that PM can be removed from between the electrodes sufficiently to eliminate electrical continuity between the electrodes by the sensor regeneration process performed in the next time abnormality diagnosis process even if the amount of PM deposited between the electrodes of the PM sensor by the abnormality diagnosis is very large because the degree of actual failure of the filter is much greater than the predetermined standard failure condition or the filter has been removed from the exhaust passage. However, if the predetermined regeneration period is set so long, the period over which the electrodes of the PM sensor are heated every time the abnormality diagnosis process is performed is necessitated to be very long. This may promote the deterioration of the PM sensor. According to the present disclosure, it is not necessary to make the predetermined regeneration period in the sensor regeneration process longer than that in the conventional sensor regeneration process. Therefore, the deterioration of the PM sensor is not promoted.

As described above, according to the present disclosure, when the abnormality diagnosis process is performed by the controller, PM is prevented from deposited between the electrodes of the PM sensor by an amount larger the amount corresponding to the predetermined abnormality criterion value. Therefore, in the abnormality diagnosis apparatus according to the present disclosure, the predetermined regeneration period in the sensor regeneration process may be set as such a period that an amount of PM corresponding to the predetermined abnormality criterion value will be oxidized and removed from between the electrodes of the PM sensor by performing the sensor regeneration process by the controller over this period. Thus, the length of the period over which the electrodes of the PM sensor are heated in the sensor regeneration process can be made as short as possible. Hence, the deterioration of the PM sensor through the sensor regeneration process can be made as little as possible.

The present disclosure can prevent an abnormality diagnosis apparatus that diagnoses abnormality of an exhaust gas purification system including a filter and a PM sensor from outputting the wrong diagnosis result that the PM sensor is abnormal although the PM sensor is actually normal but the filter is abnormal.

DESCRIPTION OF EMBODIMENTS

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless particularly stated.

Figure 1:
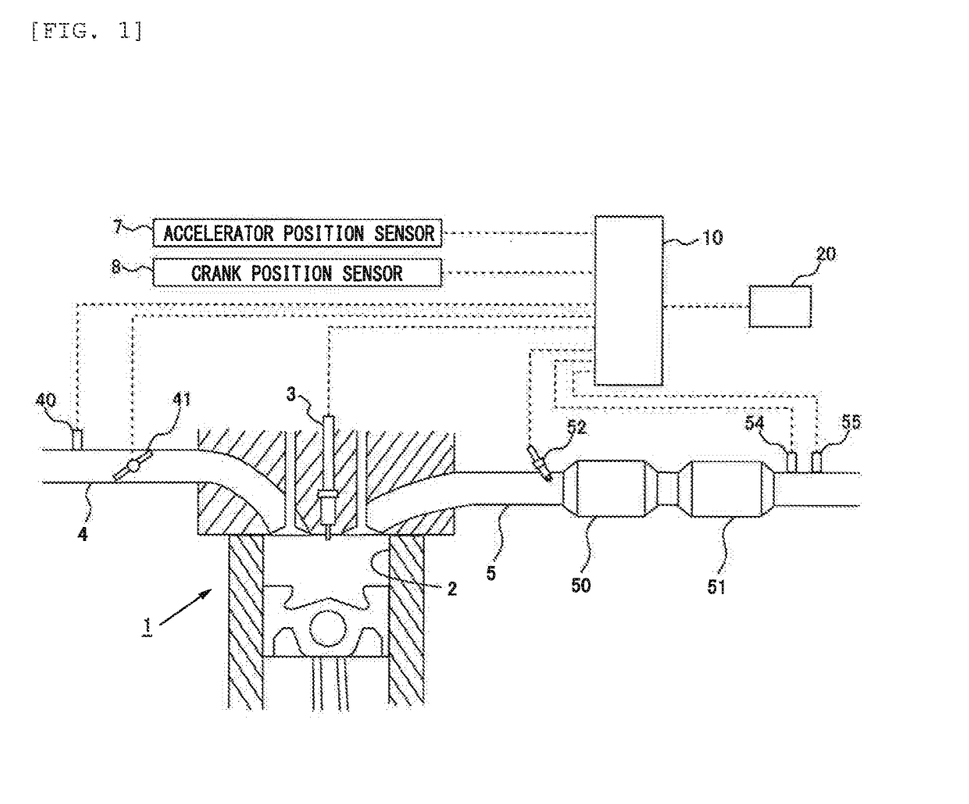
FIG. 1 is a diagram showing the general configuration of an internal combustion engine according to an embodiment of the present disclosure and its air-intake and exhaust systems.

First Embodiment (Basic Structure)
FIG. 1 is a diagram showing the general configuration of an internal combustion engine according to an embodiment of the present disclosure and its air-intake and exhaust systems. The internal combustion engine 1 shown in FIG. 1 is a compression-ignition internal combustion engine (diesel engine) that uses light oil as fuel. Alternatively, the internal combustion engine 1 may be a spark-ignition internal combustion engine that uses gasoline or the like as fuel.

The internal combustion engine 1 has a fuel injection valve 3 that injects fuel into a cylinder 2. When the internal combustion engine 1 is a spark-ignition internal combustion engine, the fuel injection valve 3 may be adapted to inject fuel into an intake port.

The internal combustion engine 1 is connected with an intake passage 4. The intake passage 4 is provided with an air flow meter 40 and an intake throttle valve 41. The air flow meter 40 outputs an electrical signal representing the quantity (or mass) of the intake air flowing in the intake passage 4. The intake throttle valve 41 is arranged in the intake passage 4 downstream of the air flow meter 40. The intake throttle valve 41 varies the channel cross sectional area of the intake passage 4 to adjust the intake air quantity of the internal combustion engine 1.

The internal combustion engine 1 is connected with an exhaust passage 5. The exhaust passage 5 is provided with an oxidation catalyst 50 and a filter 51. The filter 51 is arranged in the exhaust passage 5 downstream of the oxidation catalyst 50. The filter 51 is a wall-flow filter made of a porous substrate, which traps PM contained in the exhaust gas.

The exhaust passage is provided with a fuel addition valve 52, which is arranged upstream of the oxidation catalyst 50. The fuel addition valve 52 adds fuel to the exhaust gas flowing in the exhaust passage 5. The exhaust passage 5 is also provided with a temperature sensor 54 and a PM sensor 55, which are arranged downstream of the filter 51. The temperature sensor 54 outputs an electrical signal representing the exhaust gas temperature. The PM sensor 55 outputs an electrical signal representing the quantity of PM flowing out of the filter 51.

Figure 2:
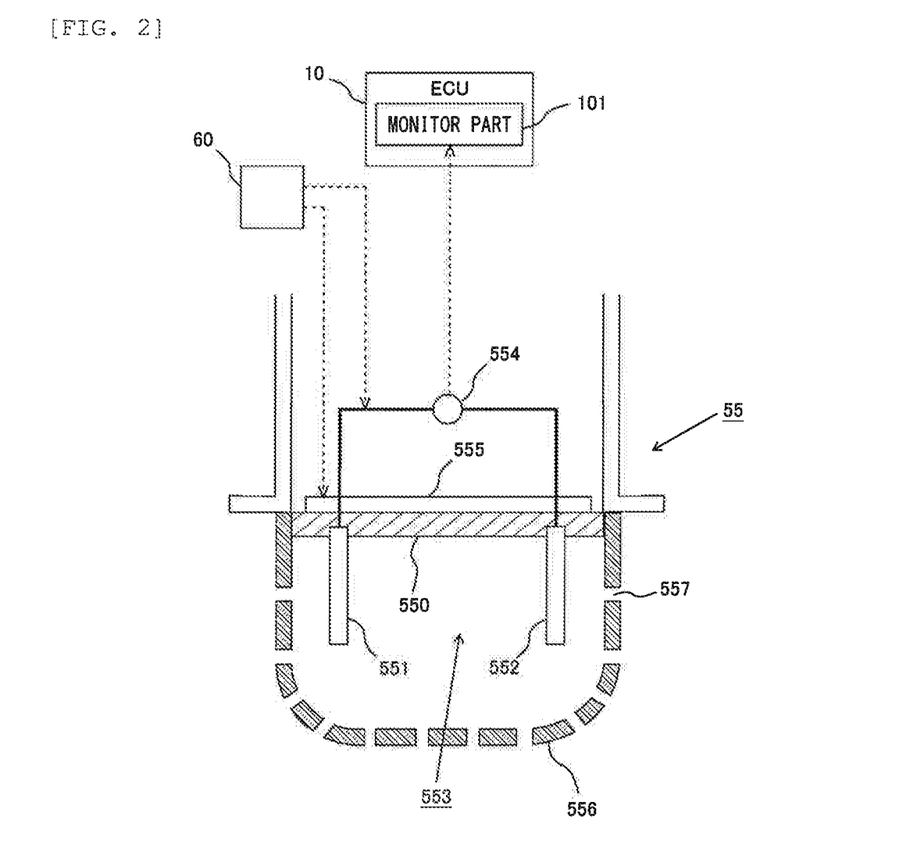
FIG. 2 is a diagram schematically showing the structure of a PM sensor according to the embodiment.

The basic structure of the PM sensor 55 will be described with reference to FIG. 2. FIG. 2 shows the basic structure of the PM sensor 55. The PM sensor 55 is one that uses electrodes. While the PM sensor 55 shown in FIG. 2 has a pair of electrodes, the PM sensor 55 may have multiple pairs of electrodes.

The PM sensor 55 has a sensor element 553, an ammeter 554, a heater 555, and a cover 556. The sensor element 553 is composed of a pair of electrodes 551 and 552 mounted on a plate-like insulator 550, which are spaced apart from each other. The ammeter 554 measures the current flowing between the electrodes 551 and 552. The heater 555 is an electric heater provided on the back surface of the insulator 550. The sensor element 553 is enclosed by the cover 556. The cover 556 has a plurality of through-holes 557. The electrodes 551 and 552 and the heater 555 of the PM sensor 55 are supplied with electrical power from a power source 60 provided externally. The PM sensor 55 outputs an output value representing a current value measured by the ammeter 554. The output value of the PM sensor 55 is input to a monitor part 101 of the ECU 10. Thus, in this embodiment, the monitor part 101 of the ECU 10 can continuously monitor the output value of the PM sensor 55. In cases where the PM sensor 55 has a sensor control unit (SCU) that controls the PM sensor 55, the SCU may include a monitor part that continuously monitors the output value of the PM sensor 55.

The PM sensor 55 configured as above is provided in the exhaust passage 5, and a part of the exhaust gas flowing in the exhaust passage 5 flows into the cover 556 through the through-holes 557. If voltage is applied between the electrodes 551 and 552 then, PM contained in the exhaust gas flowing into the cover 556 is trapped between the electrodes 551 and 552.

Figure 3:
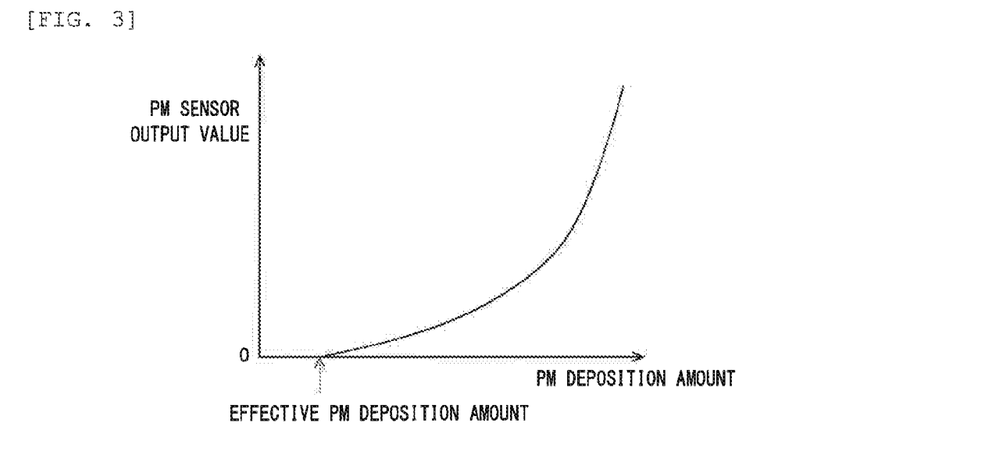
FIG. 3 is a graph showing relationship between the amount of PM deposited between the electrodes of the PM sensor and the output value of the PM sensor according to the embodiment.

The relationship between the amount of PM deposited between the electrodes 551 and 552 and the output value of the PM sensor 55 will now be described with reference to FIG. 3. In FIG. 3, the horizontal axis represents the amount of PM deposited between the electrodes 551 and 552, and the vertical axis represents the output value of the PM sensor 55. As PM is trapped between the electrodes 551 and 552, the amount of PM deposited between the electrodes 551 and 552 increases gradually. When a certain amount of PM is deposited between the electrodes 551 and 552 to form a bridge that connects one electrode 551 and the other 552, electrical continuity between the electrodes 551 and 552 is established, because the PM has electrical conductivity. When the amount of PM deposited between the electrodes 551 and 552 is smaller than a certain amount, electrical continuity between the electrodes is not established. In the following, the smallest PM deposition amount that establishes electrical continuity between the electrodes 551 and 552 will be referred to as the "effective PM deposition amount" hereinafter.

As shown in FIG. 3, until the amount of PM deposited between the electrodes 551 and 552 reaches the effective PM deposition amount, electrical continuity between the electrodes 551 and 552 is not established, and hence the output value of the PM sensor 55 is zero. In other words, a signal resulting from electrical continuity between the electrodes 551 and 552 is not output from the PM sensor 55. When the amount of PM deposited between the electrodes 551 and 552 reaches the effective PM deposition amount, the output value of the PM sensor 55 becomes larger than zero. In other words, a signal resulting from electrical continuity between the electrodes 551 and 552 is output from the PM sensor 55. After the amount of PM deposited between the electrodes 551 and 552 reaches the effective PM deposition amount, the electrical resistance between the electrodes 551 and 552 decreases with the increasing amount of PM deposited between the electrodes 551 and 552. Consequently, the current flowing between the electrodes 551 and 552 increases. Thus, the output value of the PM sensor 55 increases with the increasing amount of PM deposited between the electrodes 551 and 552. In the following, the time at which the output value of the PM sensor 55 starts to increase from zero, namely the time at which a signal resulting from electrical continuity between the electrodes starts to be output will be sometimes referred to as the "output start time".

Referring back to FIG. 1, an electronic control unit (ECU) 10 is provided for the internal combustion engine 1. The ECU 10 controls the operation state of the internal combustion engine 1. The ECU 10 is electrically connected with various sensors such as an accelerator position sensor 7 and crank position sensor 8 as well as the aforementioned air flow meter 40, the temperature sensor 54, and the PM sensor 55. The accelerator position sensor 7 outputs an electrical signal representing the amount of operation of the accelerator pedal that is not shown in the drawings (or the accelerator opening degree). The crank position sensor 8 outputs an electrical signal representing the rotational position of the engine output shaft (or the crankshaft) of the internal combustion engine 1. The output signals of these sensors are input to the ECU 10. The ECU 10 is also electrically connected with various components including the aforementioned fuel injection valve 3, the intake throttle valve 41, and the fuel addition valve 52. The ECU 10 controls these components on the basis of the output signals of the aforementioned sensors. For example, the ECU 10 performs a filter regeneration process for removing PM deposited in the filter 51 by causing the fuel addition valve 52 to add fuel. In the filter regeneration process, the temperature of the filter 51 is raised by the heat of oxidation that is generated when the fuel added through the fuel addition valve 52 is oxidized in the oxidation catalyst 50. Consequently, the PM deposited in the filter 51 is combusted and removed.

Figure 4:
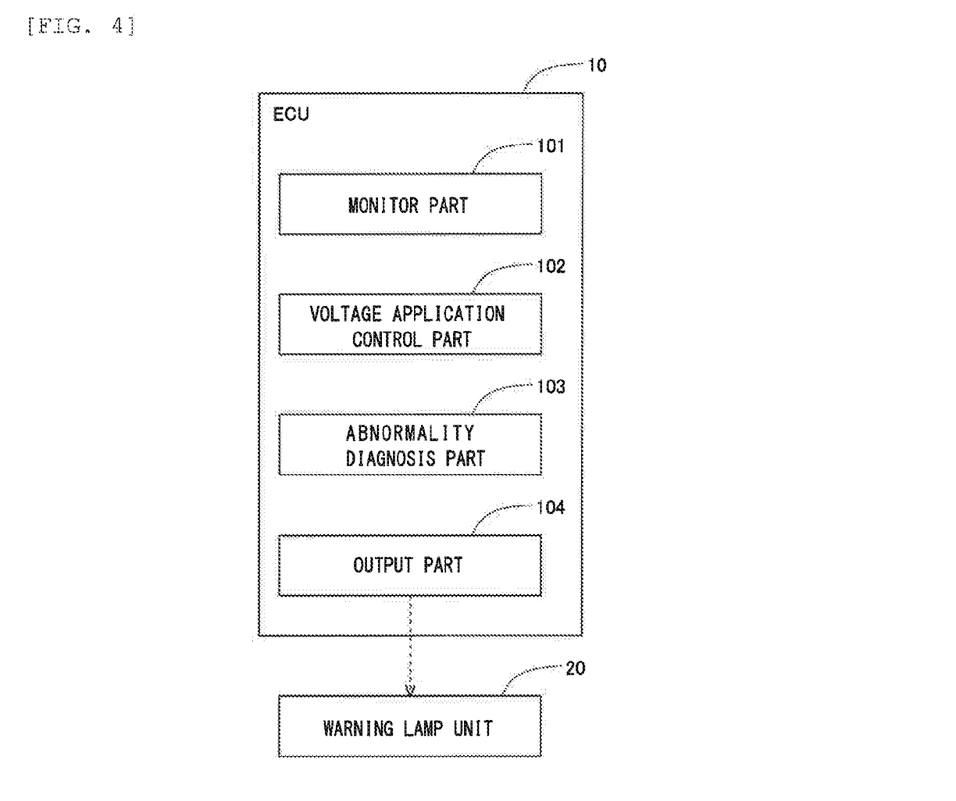
FIG. 4 is a diagram showing functional blocks of an ECU according to the embodiment.

The ECU 10 is also electrically connected with a warning lamp unit 20. The warning lamp unit 20 is provided to notify a user of abnormality of the exhaust gas purification system, when it occurs. As shown in FIG. 4, the ECU 10 has functional blocks including a voltage application control part 102, an abnormality diagnosis part 103, and an output part 104 in addition to the monitor part 101. The voltage application control part 102 has the function of controlling the voltage applied to the electrodes 551 and 552 of the PM sensor from the power source 60. The abnormality diagnosis part 103 has the function of performing an abnormality diagnosis process which is series of processes of abnormality diagnosis including a sensor regeneration process, a sensor diagnosis process, and a filter diagnosis process. These processes will be specifically described later. The output part 104 has the function of outputting the diagnosis result of the sensor diagnosis process or the diagnosis result of the filter diagnosis process in the abnormality diagnosis process performed by the abnormality diagnosis part 103 to the warning lamp unit 20. When the diagnosis result that the PM sensor 55 is abnormal is output from the output part 104 to the warning lamp unit 20, a sensor abnormality lamp indicating abnormality of the PM sensor 55 is lit in the warning lamp unit 20. When the diagnosis result that the filter 51 is abnormal is output from the output part 104 to warning lamp unit 20, a filter abnormality lamp indicating abnormality of the filter 51 is lit in the warning lamp unit 20.

(Abnormality Diagnosis Process)

The filter 51 may develop a failure such as breakage or melting in some cases due to, for example, a rise in the temperature resulting from the filter regeneration process. If abnormality of the filter such as breakage of the filter 51 or removal of the filter 51 from the exhaust passage 5 occurs, an increase in the amount of PM emitted to the atmosphere will result. In this embodiment, a filter diagnosis process is performed to diagnose abnormality of the filter 51 using the output value of the PM sensor 55. Prior to the filter diagnosis process, a sensor diagnosis process is performed to diagnose abnormality of the PM sensor 55. Moreover, in order to perform the abnormality diagnosis of the filter 51 and the abnormality diagnosis of the PM sensor 55, a sensor regeneration process is performed prior to the sensor diagnosis process to remove the PM deposited between the electrodes 551 and 552 of the PM sensor 55. Thus, the abnormality diagnosis process which is a series of processes of abnormality diagnosis including the sensor regeneration process, the sensor diagnosis process, and the filter diagnosis process is performed by the abnormality diagnosis part 103 of the ECU 10.

Figure 5:
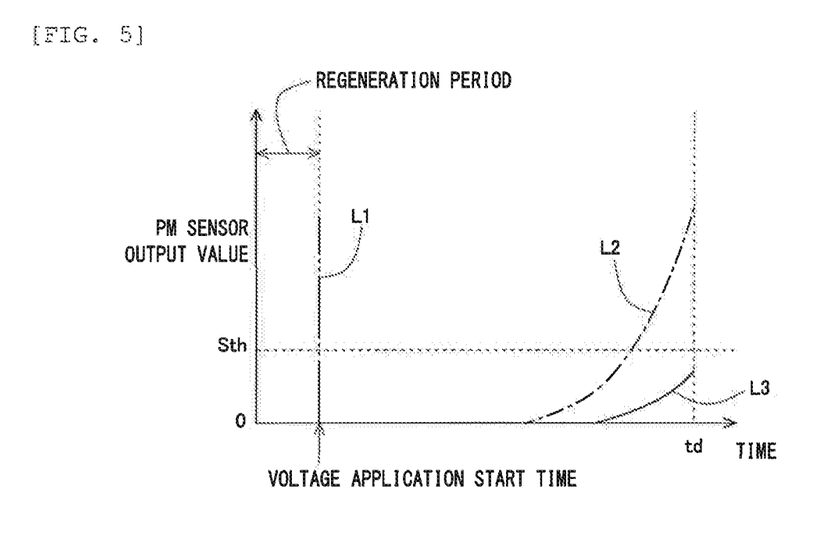
FIG. 5 is a graph showing how the output value of the PM sensor changes with time when abnormality diagnosis process is performed according to the embodiment.

FIG. 5 is a graph showing how the output value of the PM sensor 55 changes with time when the abnormality diagnosis process is performed in this embodiment in FIG. 5, the vertical axis represents the output value of the PM sensor, and the horizontal axis represents the time elapsed since start of the abnormality diagnosis process, namely the start of the sensor regeneration process. In FIG. 5, line L1 represents the change with time of the output value of the PM sensor 55 in a case where the PM sensor 55 is abnormal. Line L2 represents the change with time of the output value of the PM sensor 55 in a case where the filter 51 is abnormal. Line L3 represents the change with time of the output value of the PM sensor 55 in a case where the filter 51 is normal.

In the abnormality diagnosis process, the sensor regeneration process is performed first. Specifically, electrical power is supplied to the heater 555 by the power source 60 to heat the sensor element 553 (namely, the electrodes 551 and 552) by the heater 555 for a predetermined regeneration period. By this process, the PM deposited between the electrodes 551 and 552 is oxidized and removed. After the completion of the sensor regeneration process, the voltage application control part 102 starts the application of voltage to the electrodes 551 and 552 by the power source 60. In the following, the time at which the application of voltage to the electrodes 551 and 552 is started will also be referred to as the "voltage application start time". After the completion of the sensor regeneration process, temperature of the electrodes 551 and 552 is high for a while. A cooling time may be provided between the completion of sensor regeneration process and the voltage application start time to cool the electrodes 551 and 552.

If the PM deposited between the electrodes 551 and 552 of the PM sensor 55 has been removed substantially entirely by the sensor regeneration process, even when the application of voltage to the electrodes 551 and 552 is started at the voltage application start time, a signal resulting from electrical continuity between the electrodes 551 and 552 is not output from the PM sensor 55 (in other words, the output value of the PM sensor 55 is zero) until the amount of PM deposited between the electrodes 551 and 552 reaches the effective PM deposition amount, if the PM sensor 55 is normal. If the PM sensor 55 is abnormal (specifically, if the electrodes 551 and 552 are short-circuited), a signal resulting from electrical continuity between the electrodes 551 and 552 is output from the PM sensor 55 immediately when the application of voltage to the electrodes 551 and 552 is started, as shown by line L1 in FIG. 5. Therefore, a diagnosis as to abnormality of the PM sensor 55 can be made based on whether or not a signal resulting from electrical continuity between the electrodes 551 and 552 is output from the PM sensor 55 immediately after the start of voltage application to the electrodes 551 and 552.

As described above, if the PM sensor 55 is normal, a signal resulting from electrical continuity between the electrodes 551 and 552 starts to be output when the amount of PM deposited between the electrodes 551 and 552 reaches or exceeds the effective PM deposition amount after the start of voltage application to the electrodes 551 and 552. If the filter 51 develops a failure, the PM trapping efficiency of the filter 51 decreases. Then, in consequence, the quantity of PM flowing out of the filter 51 per unit time increases. Consequently, the amount of PM that reaches the PM sensor 55 and is trapped between the electrodes 551 and 552 also increases. If the filter 51 has been removed from the exhaust passage 5, the amount of PM that reaches the PM sensor 55 and is trapped between the electrodes 551 and 552 becomes largest, when the amount of PM discharged from the internal combustion engine 1 is the same. From the above follows that when the filter 51 is abnormal, the amount of PM deposited between the electrodes 551 and 552 reaches the effective PM deposition amount earlier than when the filter 51 is normal. Therefore, as will be seen from lines L2 and L3 in FIG. 5, the length of time from the voltage application start time to the time at which the output of the signal starts is shorter when the filter 51 is abnormal (L2) than when the filter 51 is normal (L3). Moreover, the rate of increase in the amount of PM deposited between the electrodes 551 and 552 after the output start time is higher when the filter 51 is abnormal than when the filter 51 is normal. Hence, as will be seen from lines L2 and L3 in FIG. 5, the increase in the output value of the PM sensor 55 per unit time after the output start time is larger when the filter 51 is abnormal (L2) than when the filter 51 is normal (L3).

There is the above-described difference in the change with time of the output value of the PM sensor 55 between the filter 51 in a normal condition and the filter 51 in an abnormal condition. Consequently, the output value of the PM sensor 55 after the lapse of a certain length of time since the voltage application start time is larger when the filter 51 is abnormal than when the filter 51 is normal. In conventional filter diagnosis processes, the time (td in FIG. 5) at which the amount of PM deposited between the electrodes 551 and 552 of the PM sensor that is estimated on the assumption that the filter 51 is in a standard failure condition will reach a predetermined criterion PM deposition amount after the voltage application start time is set as a determination time. The PM deposition amount estimated as above will also be referred to as the "standard PM deposition amount" hereinafter. A diagnosis as to abnormality of the filter 51 is made based on whether or not the output value of the PM sensor 55 at the determination time is equal to or larger than a predetermined abnormality criterion value (Sth in FIG. 5). In such a conventional filter diagnosis process, the application of voltage to the electrodes 551 and 552 is continued from the voltage application start time to the determination time, whether the filter 51 is normal or abnormal. Then, if the degree of actual failure of the filter 51 is much greater than the presumed standard failure condition or if the filter 51 has been removed from the exhaust passage 5, a very large amount of PM will be deposited between the electrodes 551 and 552 during the period from the voltage application start time to the determination time.

In this embodiment, the diagnosis result of the sensor diagnosis process or the diagnosis result of the filter diagnosis process is output from the output part 104 to the warning lamp unit 20, as described above. However, the diagnosis result that the filter 51 is abnormal is not output from the output part 10 to the warning lamp unit 20 when the filter 51 is diagnosed as abnormal in the filter diagnosis process in abnormal diagnosis only once. In this embodiment, the diagnosis result that the filter 51 is abnormal is output from the output part 104 to the warning lamp unit 20, if the filter 51 is diagnosed as abnormal in the filter diagnosis process multiple times consecutively when the abnormality diagnosis process is performed multiple times. This prevents the filter abnormality lamp in the warning lamp unit 20 from being lit when the filter 51 is mistakenly diagnosed as abnormal in the filter diagnosis process only once accidentally for some reason although the filter 51 is in a normal condition.

In this embodiment, even if the filter 51 is diagnosed as abnormal in the filter diagnosis process in the abnormality diagnosis process once, the abnormality diagnosis process is performed once again. When the filter regeneration process is performed according to the above-described conventional method, if the degree of actual failure of the filter 51 is much greater than presumed standard failure condition or if the filter 51 has been removed from the exhaust passage 5, a very large amount of PM will be deposited between the electrodes 551 and 552 of the PM sensor when the abnormality diagnosis process is performed. Then, the amount of PM deposited between the electrodes 551 and 552 at the time of start of the sensor regeneration process in the next time abnormality diagnosis process will be excessively large. In that case, even if the sensor regeneration process is carried out in the next time abnormality diagnosis process, it may be difficult in some cases to remove the PM between the electrodes 551 and 552 sufficiently to eliminate electrical continuity between the electrodes 551 and 552 due to the PM.

When the PM cannot be removed from between the electrodes 551 and 552 sufficiently to eliminate electrical continuity between the electrodes 551 and 552 by the sensor regeneration process in the next time abnormality diagnosis process for the above reason, a signal resulting from electrical continuity between the electrodes 551 and 552 (namely, electrical continuity due to the PM) will be output from the PM sensor 55 immediately after the start of the application of voltage to the electrodes 551 and 552 after the completion of the sensor regeneration process, even if the PM sensor 55 is normal. In such cases, the behavior of the output value of the PM sensor 55 will be similar to that in the case where the PM sensor 55 is abnormal, which is represented by line L1 in FIG. 5. Consequently, in the next time abnormality diagnosis process, the PM sensor 55 will be diagnosed as abnormal in the sensor diagnosis process performed after the sensor regeneration process, although the PM sensor 55 is normal. Then, even though the filter 51 is diagnosed as abnormal by the filter diagnosis process in the first abnormality diagnosis, the PM sensor 55 will be diagnosed as abnormal by the sensor diagnosis process in the next time abnormality diagnosis process. In that case, the filter diagnosis process will not be performed in the next time abnormality diagnosis process. Then, the filter 51 will not be diagnosed as abnormal by the filter diagnosis processes multiple times consecutively. Hence, the diagnosis result that the filter 51 is abnormal will not be output from the output, part 104 to the warning lamp unit 20, but the wrong determination result that the PM sensor 55 is abnormal will be output from the output part 104 to the warning lamp unit 20. Then, the sensor abnormality lamp will be lit in the warning lamp unit 20 to inform the user of the abnormality of the PM sensor 55 erroneously.

In this embodiment, to prevent a wrong diagnosis result from being output from the output part 104 to the warning lamp unit 20 as described above, the filter diagnosis process is carried out by a method that does not cause the deposition of an excessively large amount of PM between the electrodes 551 and 552 of the PM sensor 55 during the filter diagnosis process. Specifically, in the abnormality diagnosis process, the sensor regeneration process is performed first, and the application of voltage to the electrodes 551 and 552 of the PM sensor 55 is started at a predetermined voltage application start time after the completion of the sensor regeneration process. Moreover, abnormality diagnosis of the PM sensor 55 is performed based on whether or not a signal resulting from electrical continuity between the electrodes 551 and 552 is output from the PM sensor 55 immediately after the start of voltage application to the electrodes 551 and 552. In this embodiment, when the PM sensor 55 is not diagnosed as abnormal in this sensor diagnosis process, the output value of the PM sensor 55 is continuously monitored by the monitor part 101 of the ECU 10 afterward. Moreover, the time set as the determination time (td in FIG. 5) in the above-described conventional filter diagnosis process is set as a predetermined diagnosis completion time. Thus, the predetermined diagnosis completion time td is set as the time at which the standard PM deposition amount defined as the amount of PM deposited between the electrodes 551 and 552 of the PM sensor 55 that is estimated on the assumption that the filter 51 is in the predetermined standard failure condition will reach the predetermined criterion PM deposition amount. In this embodiment, the standard failure condition is the lowest degree of failure that is to be diagnosed as abnormality of the filter 51 in the abnormality diagnosis of the filter 51. In other words, even when the filter 51 is deteriorated to some extent, if the condition of the filter 51 is better than the standard failure condition, the filter 51 is diagnosed as normal in the abnormality diagnosis of the filter 51.

After the completion of the sensor diagnosis process, the filter diagnosis process is carried out as the process of determining whether or not the filter 51 is abnormal based on whether or not the output value of the PM sensor 55 reaches the predetermined abnormality criterion value Sth before the predetermined diagnosis completion time td. In the following, the period from the time of completion of the sensor diagnosis process to the predetermined diagnosis completion time td will also be referred to as the filter diagnosis period. Even when the PM deposited between the electrodes 551 and 552 of the PM sensor 55 has been removed substantially entirely by the sensor regeneration process, if the filter 51 is abnormal, the amount of PM deposited between the electrodes 551 and 552 of the PM sensor 55 will reach the criterion PM deposition amount during the filter diagnosis period. On the other hand, if the filter 51 is normal, the amount of PM deposited between the electrodes 551 and 552 of the PM sensor 55 will not increase to the criterion PM deposition amount during the filter diagnosis period. Therefore, if the output value of the PM sensor 55 reaches the predetermined abnormality criterion value Sth during the filter diagnosis period, the filter 51 may be diagnosed as abnormal.

In this embodiment, if the output value of the PM sensor 55 reaches the predetermined abnormality criterion value Sth during the filter diagnosis period, the voltage application control part 102 stops the application of voltage to the electrodes 551 and 552 by the power source 60. In other words, in this embodiment, if the output value of the PM sensor 55 reaches the predetermined abnormality criterion value Sth during the filter diagnosis period, the application of voltage to the electrodes 551 and 552 is not continued until the predetermined diagnosis completion time td, but the application of voltage is terminated before the predetermined diagnosis completion time td. In consequence, PM will not be trapped between the electrodes 551 and 552 after the output value of the PM sensor 55 reaches the abnormality criterion value Sth. Therefore, even in cases where the degree of actual failure of the filter 51 is much greater than the predetermined standard failure condition or the filter 51 has been removed from the exhaust passage 5, in other words, even in circumstances in which continuing the application of voltage to the electrodes 551 and 552 until the predetermined diagnosis completion time td will lead to deposition of PM between the electrodes 551 and 552 that is so large in amount that electrical continuity between the electrodes 551 and 552 due to the PM cannot be eliminated even by performing the sensor regeneration process, the amount of PM deposited between the electrodes 551 and 552 of the PM sensor 55 is prevented from exceeding the amount corresponding to the predetermined abnormality criterion value Sth, or the predetermined criterion PM deposition amount.

Figure 6:
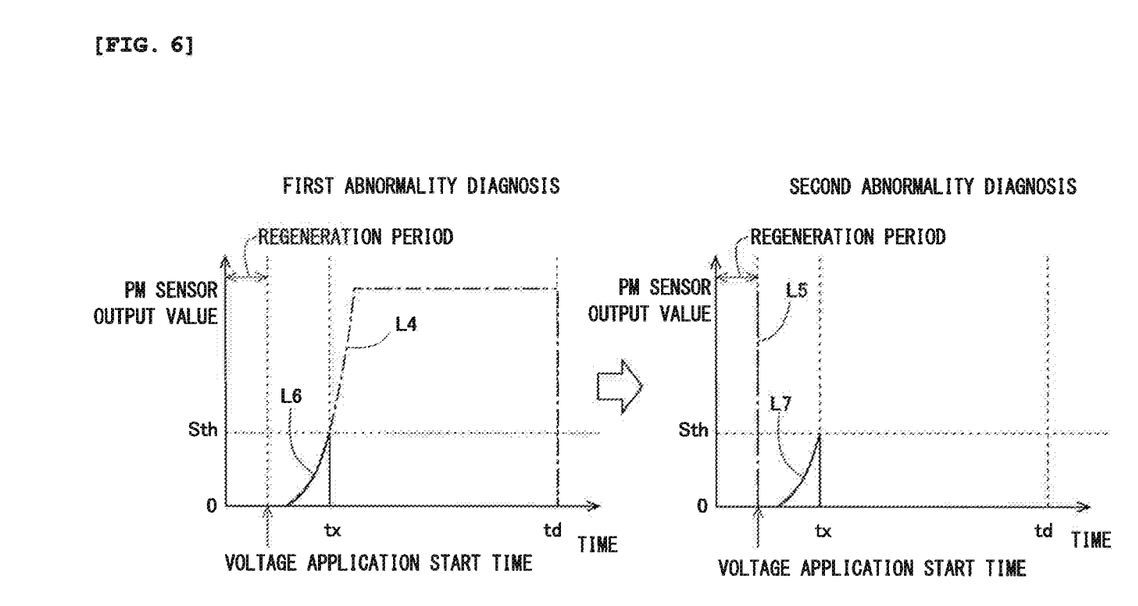
FIG. 6 is a graph showing how the output value of the PM sensor changes with time during the abnormality diagnosis when the abnormality diagnosis process is performed twice according to the embodiment in a state in which the filter has been removed from the exhaust passage.

In the following, an exemplary case where abnormality of the filter 51 is removal (or the absence) of the filter 51 from the exhaust passage and abnormality diagnosis is performed twice will be discussed. Specifically, how the output value of the PM sensor 55 changes during each time abnormality diagnosis will be described with reference to FIG. 6. FIG. 6 includes graphs showing how the output value of the PM sensor 55 changes with time during two consecutive abnormality diagnosis processes. In FIG. 6, dot-dash lines L4 and L5 represent the change with time of the output value of the PM sensor when the filter diagnosis process is performed by the aforementioned conventional method. Solid lines L6 and L7 in FIG. 6 represent the change with time of the output value of the PM sensor 55 when the filter diagnosis process is performed by the method of this embodiment.

In FIG. 6, when the first abnormality diagnosis process is performed, the amount of PM deposited between the electrodes 551 and 552 of the PM sensor 55 reaches the criterion PM deposition amount at time tx after the voltage application start time, so that the output value of the PM sensor 55 reaches the predetermined abnormality criterion value Sth at that time. As described above, in the conventional filter diagnosis process, even when the output value of the PM sensor 55 reaches the predetermined abnormality criterion value Sth after the voltage application start time, the application of voltage to the electrodes 551 and 552 is continued until the determination time (td). Consequently, as shown by the dot-dash line L4 in the graph for the first abnormality diagnosis process in FIG. 6, the output value of the PM sensor 55 continues to increase with the increasing amount of deposition of PM between the electrodes 551 and 552, even after the output value of the PM sensor 55 reaches the abnormality criterion value Sth. When the output value of the PM sensor 55 reaches its maximum value, the output value stays at the maximum value thereafter, even if the amount of PM deposited between the electrodes 551 and 552 increases further. In the second abnormality diagnosis process, an excessively large amount of PM is deposited between the electrodes 551 and 552 at the start time. Then, electrical continuity between the electrodes 551 and 552 due to the PM cannot be eliminated even though the sensor regeneration process is performed. Consequently, as shown by dot-dash line L5 in the graph for the second abnormality diagnosis process in FIG. 6, the output value of the PM sensor 55 exceeds the predetermined abnormality criterion value Sth immediately after the start of voltage application to the electrodes 551 and 552. Then, in the second abnormality diagnosis process, the PM sensor 55 is mistakenly diagnosed as abnormal by the sensor diagnosis process.

On the other hand, when the filter diagnosis process according to the embodiment is performed, if the output value of the PM sensor 55 reaches the predetermined abnormality criterion value Sth at time tx after the voltage application start time, the filter 51 is diagnosed as abnormal. Moreover, the voltage application to the electrodes 551 and 552 is stopped at the time when the output value of the PM sensor 55 reaches the predetermined abnormality criterion value Sth at time tx. Consequently, PM is not trapped between the electrodes 551 and 552 any further after time tx. Hence, the amount of PM deposited between the electrodes 551 and 552 does not increase beyond the predetermined criterion. PM deposition amount. Therefore, when the sensor regeneration process is performed in the second abnormality diagnosis process, the PM deposited between the electrodes 551 and 552 is removed substantially entirely. Consequently, as shown by solid line L6 in the graph for the first abnormality diagnosis process in FIG. 6 and solid line L7 in the graph for the second abnormality diagnosis process in FIG. 6, the behavior of the output value of the PM sensor 55 after the voltage application start time in the second abnormality diagnosis process is similar to that in the first abnormality diagnosis process. In consequence, in the filter diagnosis process in the second abnormality diagnosis process also, the filter 51 is diagnosed as abnormal.

As described above, in the abnormality diagnosis process of this embodiment, even if the degree of actual failure of the filter 51 is much greater than the predetermined standard failure condition or the filter 51 has been removed from the exhaust passage 5, deposition of an excessively large amount of PM between the electrodes 551 and 552 with the application of voltage to the electrodes 551 and 552 of the PM sensor 55 after the completion of the sensor regeneration process in the abnormality diagnosis process is prevented from occurring. Thus, in the next time abnormality diagnosis process, circumstances in which PM cannot be removed from between electrodes 551 and 552 by performing the sensor regeneration process sufficiently to eliminate electrical continuity between the electrodes 551 and 552 due to the PM are prevented from occurring.

In consequence of the prevention of the above-mentioned circumstances, in the sensor diagnosis process performed in the next time abnormality diagnosis process, the PM sensor 55 is prevented from being diagnosed abnormal mistakenly despite the fact that it is actually normal. In the case where the filter 51 is actually abnormal, the filter 51 will be diagnosed as abnormal in the filter diagnosis process performed subsequently to the sensor diagnosis process in the next time abnormality diagnosis process. As above, when the abnormality diagnosis process is performed multiple times, the PM sensor 55 will not be diagnosed as abnormal in any sensor diagnosis process, and the filter 51 will be diagnosed as abnormal in the successive filter diagnosis processes. Thus, the wrong diagnosis result that the PM sensor 55 is abnormal is prevented from being output from the output part 104 to the warning lamp unit 20 despite the fact that the PM sensor 55 is actually normal but the filter 51 is abnormal.

(Flow of Abnormality Diagnosis Process)

Figure 7:
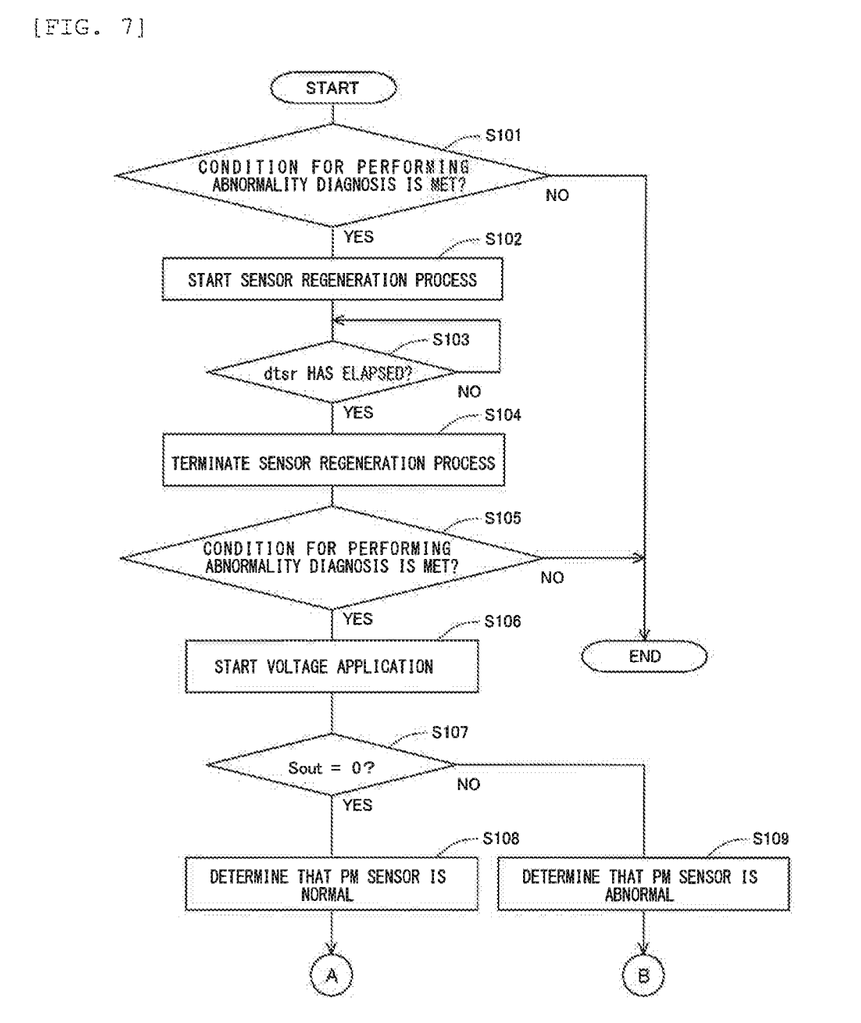
FIG. 7 is a part of a flow chart showing the flow of the abnormality diagnosis process according to the embodiment.
Figure 8:
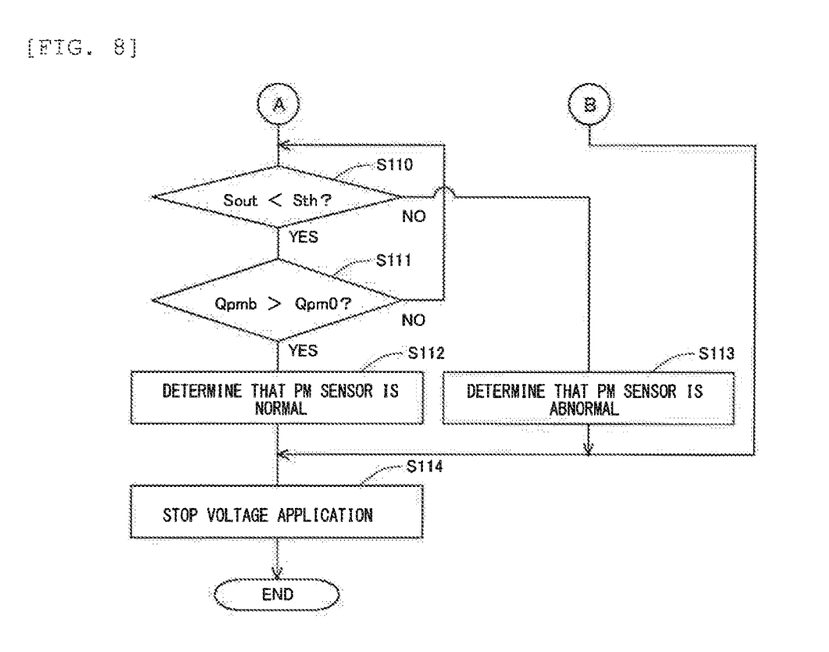
FIG. 8 is the other part of the flow chart showing the flow of the abnormality diagnosis process according to the embodiment.

In the following, the flow of abnormality diagnosis process according to this embodiment will be described with reference to the flow chart in FIGS. 7 and 8. This flow is stored in the ECU 10 in advance and executed by the abnormality diagnosis part 103.

In this flow, firstly in step S101, it is determined whether or not a predetermined condition for performing the abnormality diagnosis is met. The predetermined condition for performing the abnormality diagnosis is a condition that is set in such a way that the abnormality diagnosis process can be performed with necessary and sufficient frequency. The predetermined condition for performing the abnormality diagnosis may be, for example, that the internal combustion engine 1 is in steady state operation. If a negative determination is made in step S101, the execution of this flow is terminated.

On the other hand, if an affirmative determination is made in step S101, then in step S102, the sensor regeneration process is started. Specifically, power supply from the power source 60 to the heater 555 of the PM sensor 55 is started. Moreover, the temperature of the electrodes 551 and 552 (i.e. the temperature of the sensor element 553) is controlled to a temperature that enables oxidation of PM. Then, in step S103, it is determined whether or not a predetermined regeneration period dtsr has elapsed since the start of execution of the sensor regeneration process in step S102.

In the abnormality diagnosis process in this embodiment, the amount of PM deposited between the electrodes 551 and 552 of the PM sensor 55 is prevented from exceeding the predetermined criterion PM deposition amount corresponding to the predetermined abnormality criterion value Sth, as described above. In this embodiment, the predetermined regeneration period dtsr is set as such a period of time that the predetermined criterion PM deposition amount of PM will be oxidized and removed from between the electrodes 551 and 552 of the PM sensor 55 by performing the sensor regeneration process over this period. The predetermined regeneration period dtsr as such can be determined by, for example, experiment. When the filter diagnosis process is performed by the method according to this embodiment, if the predetermined regeneration period dtsr is set as above, the PM deposited between the electrodes 551 and 552 of the PM sensor 55 can be removed substantially entirely by the sensor regeneration process irrespective of the actual condition of the filter 51. By setting the predetermined regeneration period dtsr as above, the period of time of heating the electrodes 551 and 552 of the PM sensor 55 in the sensor regeneration process can be made as short as possible. Therefore, the deterioration of the PM sensor 55 by performing the sensor regeneration process can be made as little as possible.

If a negative determination is made in step S103, the processing of step S103 is executed again. If an affirmative determination is made in step S103, then in step S104, the sensor regeneration process is terminated. Specifically, power supply from the power source 60 to the heater 555 is stopped. Then, in step S105, it is determined again whether or not the predetermined condition for performing the abnormality diagnosis is met. When the predetermined condition for performing the abnormality diagnosis fails during the sensor regeneration process due to chance in operation state of the internal combustion engine 1 or other reasons, a negative determination is made in step S105. In that case, the execution of this flow is terminated. On the other hand, if an affirmative determination is made in step S105, the application of voltage to the electrodes 551 and 552 of the PM sensor 55 by the power source 60 is started by the voltage application control part 102 in order to perform the sensor diagnosis process and the filter diagnosis process. In consequence, PM starts to be trapped between the electrodes 551 and 552. As described above, a cooling time for cooling the electrodes 551 and 552 may be provided between the completion of the sensor regeneration process and the start of the voltage application to the electrodes 551 and 552 of the PM sensor 55.

At the time when the voltage application to the electrodes 551 and 552 is started, the estimation of the standard PM deposition amount Qpmb by the ECU 10 is started. The estimation of the standard PM deposition amount Qpmb is performed by executing a separate flow other than this flow. Even if the condition of the filter 51 is the same, the amount of PM flowing out of the filter 51 and trapped between the electrodes 551 and 552 changes depending on the amount of PM flowing out of the internal combustion engine 1, the exhaust gas flow rate, and the amount of PM deposited the filter 51. The ECU 10 may be configured to use these parameters to calculate the amount of PM deposited between the electrodes 551 and 552 in the case where the filter 51 is assumed to be in the predetermined standard failure condition. Moreover, the ECU 10 may calculate the standard PM deposition amount Qpmb by integrating the trapped amount of PM thus calculated. Alternatively, the standard PM deposition amount Qpmb may be estimated by any known method.

Subsequently to the start of voltage application to the electrodes 551 and 552 of the PM sensor 55 in step S106, it is determined in step S107 whether or not the output value Sout of the PM sensor 55 is zero. If a negative determination is made in step S107, in other words, if the output value of the PM sensor 55 is larger than zero, it means that a signal resulting from electrical continuity between the electrodes 551 and 552 is output from the PM sensor 55 immediately after the start of voltage application to the electrodes 551 and 552 of the PM sensor 55. In that case, it is determined that the PM sensor 55 is abnormal, in the next step S109. Then, in step S114, the voltage application control part 102 stops the application of voltage to the electrodes 551 and 552 of the PM sensor 55 by the power source 60. In that case, the filter diagnosis process is not performed. When it is determined in step S109 that the PM sensor 55 is abnormal, the diagnosis result that the PM sensor 55 is abnormal is memorized in the ECU 10 as the diagnosis result of the current abnormal diagnosis. On the other hand, if an affirmative determination is made in step S107, in other words, if a signal resulting from electrical continuity between the electrodes 551 and 552 is not output from the PM sensor 55, then in step S103, it is determined that the PM sensor 55 is normal. As above, the sensor diagnosis process is performed by executing the processing of step S107 to S109 in this flow. The criterion value for the determination as to whether the PM sensor 55 is abnormal or not in step S107 is not necessarily required to be zero. A predetermined criterion value for sensor diagnosis that enables the determination as to whether PM sensor 55 is abnormal or not may be set as a value larger than zero on the basis of experiment. In that case, in step S107, a determination may be made as to whether or not the output value Sout of the PM sensor 55 is smaller than the predetermined criterion value for sensor diagnosis.

After step S108, it is determined in step S110 whether or not the output value Sout of the PM sensor 55 is smaller than the predetermined abnormality criterion value Sth. If an affirmative determination is made in step S110, then in step S111, the standard PM deposition amount Qpmb at the present time that is estimated by the ECU 10 in the separate flow other than this flow as described above is read, and it is determined whether or not the standard PM deposition amount Qpmb is larger than the predetermined criterion PM deposition amount Qpm0. In other words, it is determined whether or not the predetermined diagnosis completion time td has come. If a negative determination is made in step S111, the processing of step S110 is executed again. Then, if a negative determination is made in step S110, it means that the output value Sout of the PM sensor 55 has reached the predetermined abnormality criterion value Sth before the predetermined diagnosis completion time after the completion of the sensor diagnosis process. In that case, it is determined in the next step S113 that the filter 51 is abnormal. Then in step S114, the voltage application control part 102 stops the application of voltage to the electrodes 551 and 552 of the PM sensor 55 by the power source 60. Thus, the voltage application to the electrodes 551 and 552 of the PM sensor 55 is stopped at the time when the output value Sout of the PM sensor 55 reaches the predetermined abnormality criterion value Sth. When it is determined in step S113 that the filter 51 is abnormal, the diagnosis result that the filter 51 is abnormal is memorized in the ECU 10 as the diagnosis result of the current abnormality diagnosis process. On the other hand, if an affirmative determination is made in step S111, it means that the output value Sout of the PM sensor 55 has not reached the predetermined abnormality criterion value Sth before the predetermined diagnosis completion time td after the completion of the sensor diagnosis process. In that case, then in step S112, it is determined that the PM sensor 55 is normal. As above, the sensor diagnosis process is performed by executing, the processing of steps S110 to S113 in this flow. After step S112, the voltage application control part 102 stops the voltage application to the electrodes 551 and 552 of the PM sensor 55 by the power source 60, in step S114. Thereafter, the execution of this flow is terminated.

When performing the abnormal diagnosis process according to this embodiment, the abnormality diagnosis part 103 of the ECU 10 may perform the sensor diagnosis process and the filter diagnosis process by different flows respectively, so long as the sensor diagnosis process and the filter diagnosis process are performed at timing the same as the above-described flow.

(Flow of Diagnosis Result Output Process)

Figure 9:
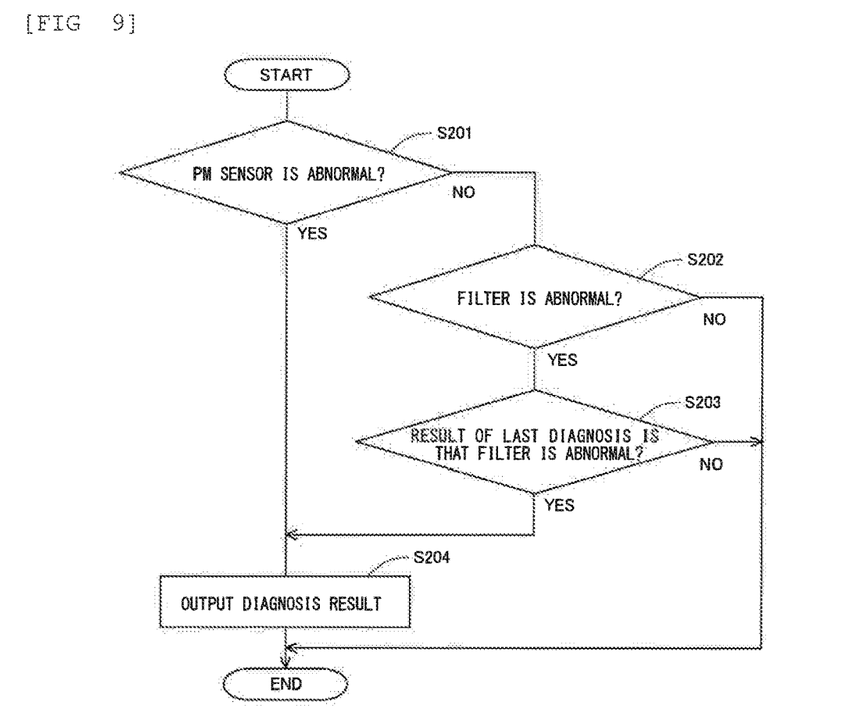
FIG. 9 is a flow chart showing the flow of a diagnosis result output process according to the embodiment.

In the following, the flow of the diagnosis result output process for outputting the result of diagnosis of the sensor diagnosis process or the filter diagnosis process from the output part 104 of the ECU 10 to the warning lamp unit 20 will be described with reference to the flow chart in FIG. 9. This flow is stored in advance in the ECU 10 and executed by the ECU 10 after the abnormality diagnosis process has been performed executing the flow shown in FIGS. 7 and 8.

In this flow, firstly in step S201, it is determined whether or not the diagnosis result that the PM sensor 55 is abnormal is memorized in the ECU 10 as the diagnosis result of the current abnormality diagnosis. In other words, it is determined whether or not it was determined that the PM sensor 55 is abnormal in step S109 in the flow chart in FIGS. 7 and 8 in the current abnormality diagnosis process. If an affirmative determination is made in step S201, then in step S204, the diagnosis result that the PM sensor 55 is abnormal is output from the output part 104 to the warning lamp unit 20. Consequently, the PM sensor abnormality lamp is lit in the warning lamp unit 20. Thereafter, the execution of this flow is terminated.

On the other hand, if a negative determination is made in step S201, then in step S202, is determined whether or not the diagnosis result that the filter 51 is abnormal is memorized in the ECU 10 as the diagnosis result of the current abnormality diagnosis. In other words, it is determined whether or not it was determined that the filter 51 is abnormal in step S113 in the flow chart in FIGS. 7 and 8 in the current abnormality diagnosis process. If an affirmative determination is made in step S202, then in step S203, it is determined whether or not the diagnosis result of the last time abnormality diagnosis is also that the filter 51 is abnormal. Even if the operation of the internal combustion engine 1 has been stopped by turning off the ignition and the power of the ECU 10 has been off during the time from the completion of the last time abnormality diagnosis process to the start of the current abnormality diagnosis process, the diagnosis result of the last time abnormality diagnosis is memorized in the ECU 10.

If an affirmative determination is made in step S203, it may be concluded that the filter 51 is diagnosed as abnormal in the consecutive filter diagnosis processes in multiple times of abnormality diagnosis process. In that case, in step S204, the diagnosis result that the filter 51 is abnormal is output from the output part 104 to the warning lamp unit 20. Consequently, the filter abnormality lamp is lit in the warning lamp unit 20. Thereafter, the execution of this flow is terminated.

On the other hand, if a negative determination is made in step S202, it may be concluded that both the PM sensor 55 and the filter 51 are diagnosed as normal in the current abnormality diagnosis process. If a negative determination is made in step S203, it may be concluded that the filter 51 was not diagnosed as abnormal in the last time abnormal diagnosis process. In these cases, no diagnosis result is output from the output part 104 to the warning lamp unit 20, and the execution of this flow is terminated.

In the abnormality diagnosis process according to this embodiment, a predetermined sensor diagnosis period for abnormality diagnosis of the PM sensor 55 may be provided after the voltage application start time. Thus, the abnormality diagnosis of the PM sensor 55 may be performed based on whether or not a signal resulting from electrical continuity between the electrodes 551 and 552 is output from the PM sensor 55 during the lapse of the predetermined sensor diagnosis period since the voltage application start time. In that case, the predetermined sensor diagnosis period may be set, for example, as a period from the voltage application start time to the output start Lime that is estimated on the assumption that the filter 51 has been removed (or is absent) from the exhaust passage 5. The output start time at which the output value of the PM sensor 55 starts to increase from zero due to deposition of PM between the electrodes 551 and 552 is earliest in the case where the filter 51 has been removed from the exhaust passage 5. Therefore, if the PM sensor 55 is normal and the PM has been removed from between the electrodes 551 and 552 substantially entirely by performing the sensor regeneration process, a signal resulting from electrical continuity between the electrodes 551 and 552 will not be output from the PM sensor 55 at least until the output start time that is estimated on the assumption that the filter 51 has been removed from the exhaust passage 5. Therefore, if a signal resulting from electrical continuity between the electrodes 551 and 552 is output from the sensor 55 during the predetermined sensor diagnosis period set as above, it may be diagnosed that the PM sensor 55 is abnormal. In this case also, if the PM sensor 55 is not diagnosed as abnormal by the sensor diagnosis process and the output value of the PM sensor 55 reaches the predetermined abnormality criterion value Sth before the predetermined diagnosis completion time td after the completion of the sensor diagnosis process, the filter 51 may be diagnosed as abnormal.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An abnormality diagnosis apparatus for an exhaust gas purification system including a filter provided in an exhaust passage of an internal combustion engine to trap particulate matter in exhaust gas and a PM sensor provided in the exhaust passage downstream of said filter, said PM sensor having a pair of electrodes as a sensor element and outputting a signal representing the amount of PM deposited between said electrodes when electrical continuity between said electrodes is established due to deposition of PM between the electrodes, comprising a controller comprising at least one processor configured to:

control application of voltage to said electrodes of said PM sensor;

perform an abnormality diagnosis process which is a series of processes of abnormality diagnosis including a sensor regeneration process of removing PM deposited between said electrodes of said PM sensor, a sensor diagnosis process of diagnosing abnormality of said PM sensor, and a filter diagnosis process of diagnosing abnormality of said filter, said sensor regeneration process being the process of removing PM deposited between said electrodes by oxidizing it by heating said electrodes of said PM sensor for a predetermined regeneration period, said sensor diagnosis process being the process of determining whether or not said PM sensor is abnormal based on whether or not a signal resulting from electrical continuity between said electrodes is output from said PM sensor after the application of voltage to said electrodes of said PM sensor is started by the controller at a predetermined voltage application start time after the completion of said sensor regeneration process, said filter diagnosis process being the process of determining whether or not said filter is abnormal based on whether or not the output value of said PM sensor reaches a predetermined abnormality criterion value by a predetermined diagnosis completion time at which the amount of PM deposited between said electrodes of said PM sensor that is estimated on the assumption that said filter is in a predetermined standard failure condition will reach a predetermined criterion PM deposition amount after the completion of said sensor diagnosis process, said filter diagnosis process being performed when said PM sensor is not diagnosed as abnormal by said sensor diagnosis process; and output a diagnosis result of said sensor diagnosis process or a diagnosis result of said filter diagnosis process when said abnormality diagnosis process is performed by the controller, wherein if said PM sensor is diagnosed as abnormal by said sensor diagnosis process when said abnormality diagnosis process is performed, the controller outputs the diagnosis result that said PM sensor is abnormal, and if said filter is diagnosed as abnormal in said filter diagnosis process multiple times consecutively when said abnormality diagnosis process is performed multiple times, the controller outputs the diagnosis result that said filter is abnormal, wherein while said abnormality diagnosis process is performed by said controller, and the output value of said PM sensor reaches said predetermined abnormality criterion value before said predetermined diagnosis completion time after the completion of said sensor diagnosis process, said controller diagnoses said filter as abnormal in said filter diagnosis process and stops the application of voltage to said electrodes of said PM sensor at the time when the output value of said PM sensor reaches said predetermined abnormality criterion value.

2. An abnormality diagnosis apparatus for an exhaust gas purification system according to claim 1, wherein said predetermined regeneration period in said sensor regeneration process is set as such a period that an amount of PM corresponding to said predetermined abnormality criterion value will be oxidized and removed from between said electrodes of said PM sensor by performing said sensor regeneration process by said controller over this period.

* * * * *